United States Patent
Tseng et al.

(10) Patent No.: US 10,516,432 B2
(45) Date of Patent: Dec. 24, 2019

(54) COMMUNICATION SYSTEM WITH SWITCHABLE DEVICES

(71) Applicant: MediaTek Inc., Hsin-Chu (TW)

(72) Inventors: Sheng-Che Tseng, New Taipei (TW); Shih-Chieh Yen, Taipei (TW); Chi-Yao Yu, Hsinchu County (TW); Chao-Wei Wang, Zhubei (TW)

(73) Assignee: MediaTek Inc., Hsin-Chu (TW)

( * ) Notice: Subject to any disclaimer, the term of this patent is extended or adjusted under 35 U.S.C. 154(b) by 77 days.

(21) Appl. No.: 15/729,404

(22) Filed: Oct. 10, 2017

(65) Prior Publication Data

US 2018/0159582 A1 Jun. 7, 2018

Related U.S. Application Data (60) Provisional application No. 62/428,572, filed on Dec. 1, 2016.

(51) Int. Cl.
*H04B 1/44* (2006.01)
*H04B 1/00* (2006.01)
*H04B 7/08* (2006.01)

(52) U.S. Cl.
CPC ............. *H04B 1/44* (2013.01); *H04B 1/006* (2013.01); *H04B 7/0817* (2013.01)

(58) Field of Classification Search
CPC ......... H04B 1/44; H04B 1/006; H04B 7/0817
USPC .......................................................... 455/78
See application file for complete search history.

(56) References Cited

U.S. PATENT DOCUMENTS

| | | |
|---|---|---|
| 8,416,758 B1 | 4/2013 | Rousu et al. |
| 8,824,976 B2 | 9/2014 | See |
| 8,923,780 B2 | 12/2014 | Ojo et al. |
| 8,977,216 B2 | 3/2015 | Weissman et al. |
| 8,995,591 B2 | 3/2015 | Gudem et al. |
| 9,014,648 B2 | 4/2015 | Gudem et al. |
| 9,048,928 B2 | 6/2015 | Tasic et al. |
| 9,154,356 B2 | 10/2015 | Tasic et al. |
| 9,172,402 B2 | 10/2015 | Gudem et al. |
| 9,178,669 B2 | 11/2015 | Fernando |
| 9,252,827 B2 | 2/2016 | Gudem et al. |

(Continued)

OTHER PUBLICATIONS

EP 17203631.1, Apr. 10, 2018, Extented European Search Report. Extended European Search Report dated Apr. 10, 2018 in connection with Application No. EP 17203631.1.

*Primary Examiner* — Eugene Yun
(74) *Attorney, Agent, or Firm* — Wolf, Greenfield & Sacks, P.C.

(57) ABSTRACT

According to at least one aspect, a communication system is provided. The communication system includes a first switch device configured to receive a first plurality of radio frequency (RF) signals detected by an antenna array and provide an RF signal selected from among the first plurality of RF signals to a receiver circuit, the first plurality of RF signals comprising a first RF signal in a first frequency range and a second RF signal in a second frequency range that is different from the first frequency range; and a second switch device configured to receive a second plurality of RF signals detected by the antenna array and provide an RF signal selected from among the second plurality of RF signals to the receiver circuit, the second plurality of RF signals comprising a third RF signal in the first frequency range and a fourth RF signal in the second frequency range.

20 Claims, 4 Drawing Sheets

(56) References Cited

U.S. PATENT DOCUMENTS

| | | |
|---|---|---|
| 9,277,641 B2 | 3/2016 | Youssef et al. |
| 9,300,420 B2 | 3/2016 | Chang et al. |
| 9,326,171 B2 | 4/2016 | Kohlmann et al. |
| 9,331,720 B2 | 5/2016 | Presti |
| 9,362,958 B2 | 6/2016 | Gudem et al. |
| 2009/0085818 A1* | 4/2009 | Rohani ............... H03H 7/0161 343/747 |
| 2013/0016633 A1 | 1/2013 | Lum et al. |
| 2013/0043946 A1 | 2/2013 | Hadjichristos et al. |
| 2013/0230080 A1 | 9/2013 | Gudem et al. |
| 2013/0287077 A1 | 10/2013 | Fernando et al. |
| 2014/0105079 A1 | 4/2014 | Bengtsson et al. |
| 2015/0188582 A1 | 7/2015 | Kahrizi et al. |
| 2015/0207536 A1 | 7/2015 | Yehezkely et al. |
| 2015/0351131 A1 | 12/2015 | Woo et al. |
| 2016/0119016 A1 | 4/2016 | Khlat |
| 2016/0248451 A1 | 8/2016 | Weissman et al. |

* cited by examiner

COMMUNICATION SYSTEM WITH SWITCHABLE DEVICES

CROSS-REFERENCE TO RELATED APPLICATIONS

This application claims priority to U.S. provisional application Ser. No. 62/428,572 titled "RECEIVER WITH SWITCHABLE DEVICES," filed on Dec. 1, 2016, which is hereby incorporated herein by reference in its entirety.

BACKGROUND

1. Technical Field

The techniques described herein relate to techniques to improve communication systems, such as receivers in wireless communication systems.

2. Discussion of the Related Art

In wireless communication systems, a transmitter system typically embeds information in a radio frequency (RF) signal and wirelessly transmits the RF signal using an antenna. A receiver system detects the RF signal using another antenna and processes the RF signal to recover the embedded information.

Some high data rate wireless communication systems include transmitter systems that simultaneously transmit multiple RF signals in different frequency ranges to increase data transfer rates over the communication link. For example, Long Term Evolution (LTE) Advanced systems typically employ a carrier aggregation scheme where multiple RF signals are transmitted simultaneously in different frequency ranges (called component carrier signals). Each of these component carrier signals may support a data transfer rate of up to 150 megabits per second (Mbps). Thereby, the data transfer rate of the communication link increases as additional component carrier signals are transmitted (e.g., two component carrier signals may support data transfer rates up to 300 Mbps).

SUMMARY

According to at least one aspect, a communication system (e.g., a cellular communication system with LTE-Advanced communication capability) is provided. The communication system may be integrated into, for example, a wireless cellular device such as a cell phone. The communication system comprises: a first switch device configured to receive a first plurality of radio frequency (RF) signals detected by an antenna array and provide an RF signal selected from among the first plurality of RF signals to a receiver circuit, the first plurality of RF signals comprising a first RF signal (e.g., a first component carrier signal) in a first frequency range and a second RF signal (e.g., a second component carrier signal) in a second frequency range that is different from the first frequency range; and a second switch device configured to receive a second plurality of RF signals detected by the antenna array and provide an RF signal selected from among the second plurality of RF signals to the receiver circuit, the second plurality of RF signals comprising a third RF signal in the first frequency range and a fourth RF signal in the second frequency range.

In some embodiments, the communication system further comprises a front end circuit network configured to filter a first signal from a first antenna in the antenna array to generate the first RF signal and the fourth RF signal. In some embodiments, the front end circuit network is configured to filter a second signal from a second antenna in the antenna array to generate the second RF signal and the third RF signal.

In some embodiments, the first switch device is configured to amplify the RF signal selected from the first plurality of RF signals. In some embodiments, the first switch device is configured to receive a control signal and select the RF signal from among the first plurality of RF signals to provide to the receiver circuit based on the control signal. In some embodiments, the first switch device comprises an output to provide the RF signal selected from among the first plurality of RF signals and a first transistor coupled to the output and having a gate terminal configured to receive the control signal. In some embodiments, the first switch device comprises a second transistor coupled in series with the first transistor and having a gate terminal configured to receive the first RF signal. In some embodiments, the first switch device comprises an input to receive the first RF signal and an amplifier coupled between the input and the first transistor. In some embodiments, the first switch device comprises a second transistor coupled in parallel with the first transistor and having a gate terminal configured to receive an inverted version of the control signal.

In some embodiments, the communication system comprises the antenna array and the receiver circuit. In some embodiments, the communication system comprises a processing device configured to receive an output from the receiver circuit and control operation of the first switch device based on the received output from the receiver circuit. In some embodiments, the receiver circuit comprises a first receiver configured to receive the RF signal selected from among the first plurality of RF signals and a second receiver configured to receive the RF signal selected from among the second plurality of RF signals.

In some embodiments, the communication system comprises a processing device configured to control operation of the first switch device and the second switch device. In some embodiments, the processing device is configured to receive an output from the receiver circuit and control operation of the first switch device and the second switch device based on the received output from the receiver circuit. In some embodiments, the processing device is configured to select a mode of operation from among a plurality of modes of operation based on the received output from the receiver circuit and control the first switch device and the second switch device based on the selected mode of operation. In some embodiments, the plurality of modes of operation comprises a first mode of operation where the first and third RF signals are provided to the receiver circuit, a second mode of operation where the second and fourth RF signals are provided to the receiver circuit, a third mode where the first and fourth RF signals are provided to the receiver circuit, and a fourth mode where the second and third RF signals are provided to the receivers circuit.

According to at least one aspect, a communication system is provided. The communication system comprises: a first switch device configured to receive a first plurality of radio frequency (RF) signals detected by an antenna array and select an RF signal from among the first plurality of signals to provide to a receiver circuit based on a first control signal; a second switch device configured to receive a second plurality of radio frequency (RF) signals detected by the antenna array and select an RF signal from among the second plurality of RF signals to provide to the receiver circuit based on a second control signal; and a processing device configured to select a mode of operation from among a plurality of modes of operation and generate the first control signal and the second control signal based on the selected mode of operation, the plurality of modes of operation comprising a first mode of operation where RF signals in a first frequency range are provided to the receiver circuit and a second mode of operation where RF signals in the first frequency range and a second frequency range that is different from the first frequency range are provided to the receiver circuit.

In some embodiments, the processing device is configured to receive an output from the receiver circuit and select the mode of operation from among the plurality of modes of operation based on the output from the receiver circuit. In some embodiments, the first plurality of RF signals comprises a first RF signal in the first frequency range and a second RF signal in the second frequency range. In some embodiments, the communication system comprises a front end circuit network configured to filter a first signal from a first antenna in the antenna array to generate the first RF signal. In some embodiments, the front end circuit network is configured to filter a second signal from a second antenna in the antenna array to generate the second RF signal.

In some embodiments, the first switch device comprises an output to provide the RF signal selected from among the first plurality of RF signals and a first transistor coupled to the output and having a gate terminal configured to receive the first control signal. In some embodiments, the first switch device comprises a second transistor coupled in series with the first transistor and having a gate terminal configured to receive one RF signal from among the first plurality of RF signals. In some embodiments, the first switch device comprises an input to receive one RF signal from among the first plurality of RF signals and an amplifier coupled between the input and the first transistor. In some embodiments, the first switch device comprises a second transistor coupled in parallel with the first transistor having a gate terminal configured to receive an inverted version of the first control signal.

The foregoing summary is provided by way of illustration and is not intended to be limiting.

BRIEF DESCRIPTION OF DRAWINGS

In the drawings, each identical or nearly identical component that is illustrated in various figures may be represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Conventional communication systems typically employ receiver systems with multiple antennas to improve the reliability of the wireless communication link. The receiver system typically includes a dedicated receiver for each of the antennas that processes the detected wireless signal from the antenna. In high data rate communication systems that employ multiple RF signals at different frequencies, the receiver system typically includes a dedicated receiver for each unique antenna and frequency range pair. For example, a receiver system may receive two RF signals at different frequencies using four antennas and have eight dedicated receivers.

The inventors have appreciated that cellular communication networks typically comprise cell towers operating in different modes. For example, some cell towers in a network may use multiple RF signals in different frequency ranges to enhance data throughput to cell phones while other cell towers in the network may only communicate with one RF signal in one frequency range to enlarge the coverage area and, thereby, communicate with cell phones that are further away from the cell tower. The particular mode of operation of a cell tower may be decided by the cell tower operator based on, for example, where the cell tower is located. The inventors have further appreciated that adding more dedicated receivers to existing receiving systems (e.g., receiving systems in cell phones) to enable high speed communication with cell towers that employ RF signals in multiple frequency ranges while still supporting communication with cell towers that employ RF signals in one frequency range may be prohibitively expensive.

Accordingly, the inventors have devised various techniques to re-use the receivers in the receiving system and adapt to the capabilities of different devices (e.g., cell towers) in communication with the receiver system without increasing the number of receivers in (and the cost of) the receiver system. In some embodiments, switch devices may be added to the receiver system to change the particular RF signal that is provided to a receiver. Thereby, different RF signals may be provided to a particular receiver based on the capabilities of a device in communication with the receiving system. Accordingly, the receiver system may consist of a smaller number of receivers than the total number of unique antenna and frequency range pairs.

The aspects and embodiments described above, as well as additional aspects and embodiments, are described in greater detail further below. These aspects and/or embodiments may be used individually, all together, or in any combination of two or more, as the application is not limited in this respect.

Figure 1:
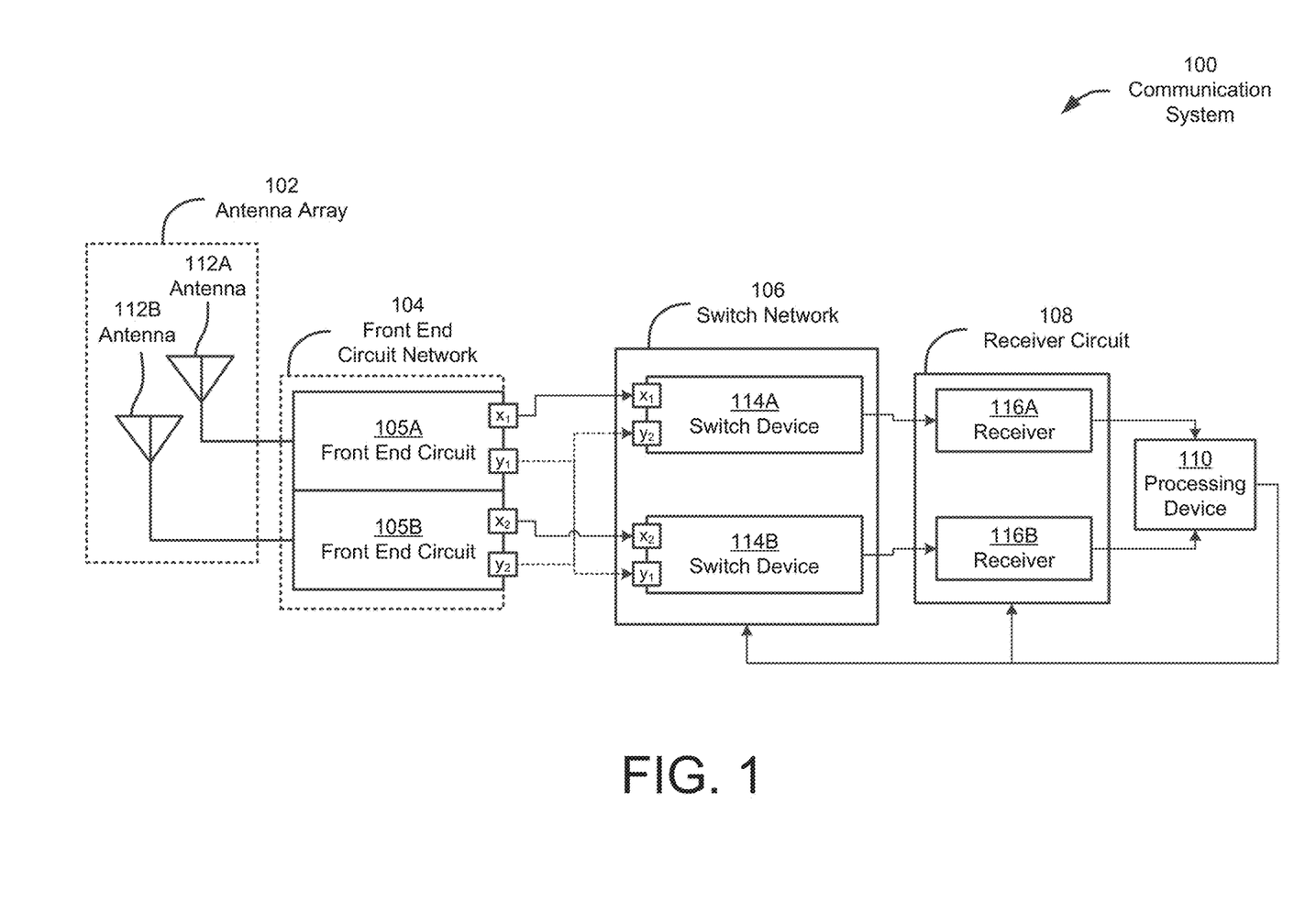
FIG. 1 shows a diagram of a communication system, according to some embodiments.

FIG. 1 shows a diagram of an example communication system 100 including a switch network 106 to selectively provide RF signals to a receiver circuit 108 based on, for example, the particular capabilities of the device (e.g., a cell tower) that the communication system 100 is in communication with. The communication system 100 may be integrated into, for example, a wireless cellular device such as a cell phone. As shown, the communication system 100 detects a wireless signal using antennas 112A and 112B in an antenna array 102. A front end circuit network 104 filters the detected wireless signal from the antenna array 102 to generate a set of RF signals $x_1$, $x_2$, $y_1$, and $y_2$. The RF signals $x_1$, $x_2$ may be detected by antennas 112A and 112B, respectively, and be in frequency range x. The RF signals $y_1$, $y_2$ may be detected by antennas 112A and 112B, respectively, and be in frequency range y. The RF signals $x_1$ and $y_1$ may be generated by a front end circuit 105A and the RF signals $x_2$ and $y_2$ may be generated by a front end circuit 105B. The set of RF signals may be provided to the switch network 106 comprising switch devices 114A and 114B. The switch devices 114A and 114B control which RF signals of the set of RF signals are provided to receivers 116A and 116B in the receiver circuit 108. An output of the receivers 116A and 116B is provided to a processing device 110 that uses the received output to control the switch network 106 and the receiver circuit 108.

The antenna array 102 comprises antennas 112A and 112B that are each configured to detect wireless signals. The antennas 112A and 112B may have a similar (or same) construction and be placed in different locations to provide spatial diversity. For example, the communication system 100 may be integrated into a cell phone and the antennas 112A and 112B may be located in two opposite corners of the cell phone.

The front end circuit network 104 receives the detected wireless signals from the antenna array 102 and filters the detected wireless signals to generate a set of RF signals using front end circuits 105A and 105B. Each of the RF signals in the set of RF signals may have a unique source antenna and frequency range pair. For example, the RF signal $x_1$ may be in frequency range x and originate from antenna 112A, the RF signal $x_2$ may be in frequency range x and originate from antenna 112B, the RF signal $y_1$ may be in frequency range y and originate from antenna 112A, and the RF signal $y_2$ may be in frequency range y and originate from antenna 112B. The set of RF signals may be generated by filtering the detected wireless signals from the antenna array 102. For example, the RF signal $x_1$ may be generated by filtering a detected wireless signal from antenna 112A using a filter that blocks frequencies outside of frequency range x. In this example, the filter may be integrated into, for example, front end circuit 105A.

It should be appreciated that additional components may be integrated into the front end circuits 105A and 105B apart from filters. For example, the front end circuits 105A and 105B may comprise one or more low-noise amplifiers (LNAs). Further, the front end circuits 105A and 105B may receive detected wireless signals from more than a single antenna or share a single antenna. Thereby, the front end circuit network 104 may be implemented using fewer (or more) front end circuits.

The switch network 106 receives the set of RF signals from the front end circuit network 104 and provides a subset of the set of RF signals to the receiver circuit 108. The particular RF signals from the set of the RF signals that are provided to the receiver circuit 108 is determined by the state of the switch devices 114A and 114B. For example, the state of the switch device 114A may determine whether RF signal $x_1$ or RF signal $y_2$ is provided to receiver 116A. Further, the state of switch device 114B may determine whether RF signal $x_2$ or RF signal $y_1$ is provided to receiver 116B. The state of the switch devices 114A and 114B may be controlled by one or more control signals received from the processing device 110.

The state of the switch devices 114A and 114B in the switch network 106 may be controlled to enable multiple modes of operation of the communication system 100. For example, the communication system 100 may operate in a first mode where RF signals in the same frequency range from different antennas are provided to the receiver circuit 108 or in a second mode where RF signals in different frequency ranges from the same antenna are provided to the receiver circuit 108. In the first mode, the antenna diversity of the communication system 100 is increased by processing RF signals in the same frequency range from different antennas. The first mode may be used during communication with devices (e.g., cell towers) that are only capable of communicating using a single frequency range. In the second mode, the bandwidth of the communication system 100 is increased by processing RF signals in different frequency ranges (carrying different information) simultaneously. The second mode may be used during communication with devices (e.g., cell towers) that are capable of communicating using two or more frequency ranges.

The switch devices 114A and 114B may each be arranged so as to receive RF signals in different frequency ranges from different antennas. As shown in FIG. 1, a first switch device 114A receives RF signal $x_1$ in range x from antenna 112A and RF signal $y_2$ in range y from antenna 112B. Similarly, the switch device 114B receives RF signal $x_2$ in range x from antenna 112B and RF signal $y_1$ in range y from antenna 112A. Arranging the switch devices 114A and 114B in such a fashion advantageously allows output combinations from the switch network 106 where either RF signals from the same antenna in different frequency ranges or RF signals from different antennas in the same frequency range may be provided to the receiver circuit 108. For example, RF signals $x_1$ and $y_1$ may be provided to the receiver circuit 108 or RF signals $x_1$ and $x_2$ may be provided to the receiver circuit 108. The particular modes of operation that can be provided by the particular implementation of the switch network 106 in communication system 100 are shown below in Table 1.

TABLE 1

Example Modes of Operation of Communication System 100

| Mode # | Source Antenna(s) | Frequency range(s) | Switch Device 114A Output | Switch Device 114B Output |
| --- | --- | --- | --- | --- |
| 1 | 112A and 112B | x | RF Signal $x_1$ | RF Signal $x_2$ |
| 2 | 112A and 112B | y | RF Signal $y_2$ | RF Signal $y_1$ |
| 3 | 112A | x and y | RF Signal $x_1$ | RF Signal $y_1$ |
| 4 | 112B | x and y | RF Signal $y_2$ | RF Signal $x_2$ |

In some embodiments, the switch devices 114A and/or 114B may be constructed to perform more than simply selectively provide one of the received RF signals as an output signal. For example, the switch devices 114A and/or 114B may also be constructed as an LNA to amplify the RF signal provided as an output.

The receiver circuit 108 receives RF signals from the switch network 106 and extracts information from the received RF signals. The receiver circuit 108 may include a dedicated receiver for each switch device in the switch network 106. For example, as shown in FIG. 1, the receiver circuit 108 may include two receivers 116A and 116B for the two switch devices 114A and 114B.

The receiver circuit 108 receives control signals from the processing device 110 to ensure that the receiver circuit 108 properly processes the RF signals received from the switch network 106. For example, the control signals may adjust a frequency of a signal used by the receivers 116A and/or 116B to downconvert the received RF signals.

The processing device 110 receives an output from the receiver circuit 108 and generates control signals for the switch network 106 and the receiver circuit 108 based on the received output from the receiver circuit 108. The processing device 110 may identify a capability of a device (e.g., a cell tower) that is communicating with the communication system 100 based on the output from the receiver circuit 108. For example, the device that is communicating with the communication system 100 may transmit information indicative of the capability of the device during initiation of the communication link between the device and the communication system 100. The processing device 110 may employ information regarding the capability of the device that is communication with the communication system 100 to select a mode of operation of the communication system 100 and generate the appropriate control signals for the switch network 106 and the receiver circuit 108 to cause the communication system 100 to operate in the selected mode. For example, the processing device 110 may detect that a cell tower is only capable of communicating with the communication system in one range (e.g., range x). In this example, the processing device 110 may select a first mode of operation, control the switch network to provide the RF signals $x_1$ and $x_2$ to the receiver circuit 108, and control the receiver circuit 108 to extract information from the received RF signals in frequency range x. In another example, the processing device 100 may detect that a cell tower is capable of communication with the communication system in two different ranges (e.g., range x and range y). In this example, the processing device 110 may select a second mode of operation, control the switch network to provide RF signals $x_1$ and $y_1$ to the receiver circuit 108, and control the receivers 116A and 116B to extract information from the received RF signals in frequency ranges x and y, respectively.

Figure 2:
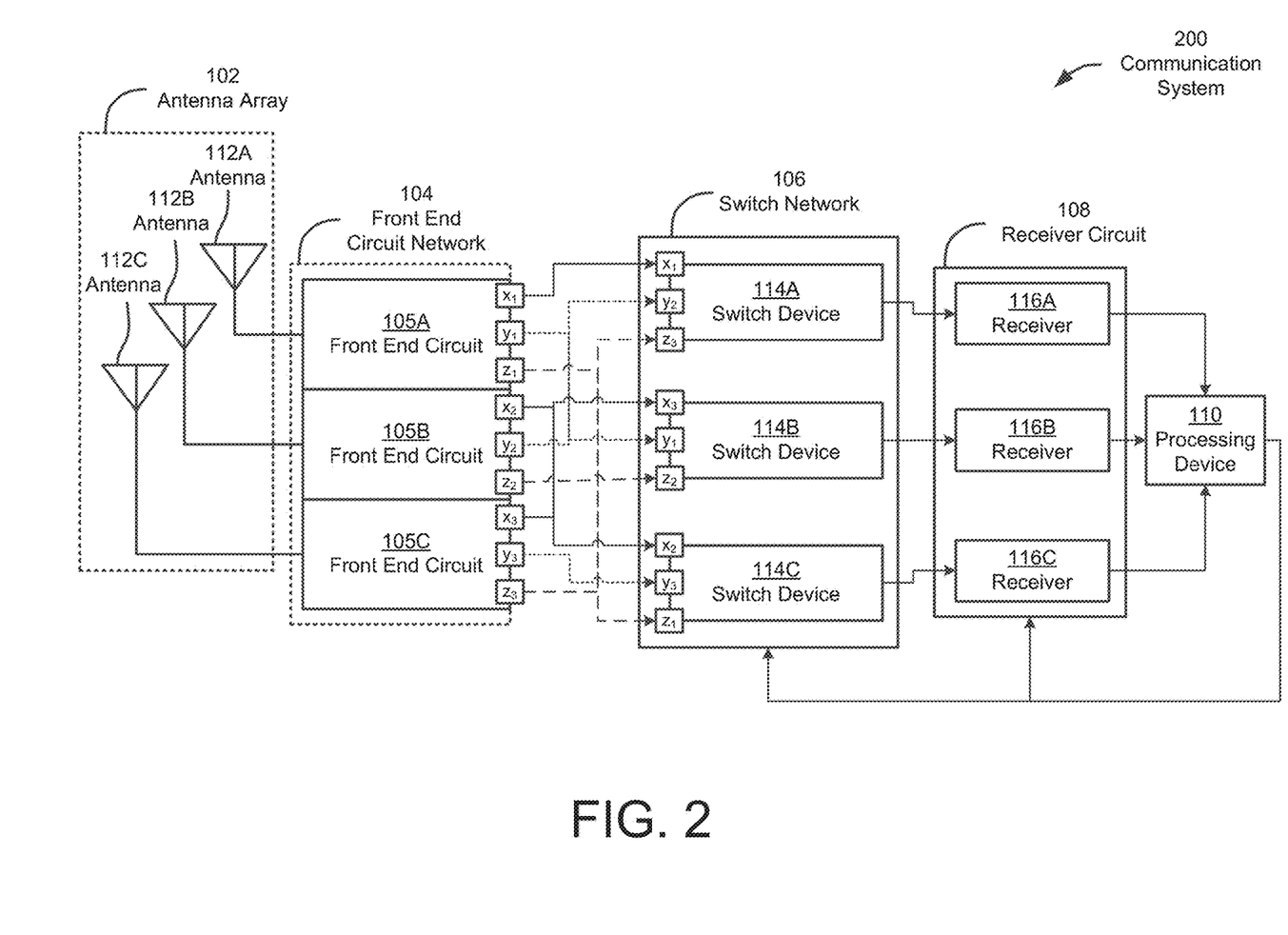
FIG. 2 shows another diagram of a communication system, according to some embodiments.

It should be appreciated that various alterations may be made to the communication system 100 without departing from the scope of the present disclosure. For example, the communication system 100 may be extended to communication systems with more than two antennas 112 and/or more than two RF signals in two frequency ranges. An example of such a communication system is shown in FIG. 2 by communication system 200. As shown, the communication system 200 comprises an antenna array 102 with three antennas 112A, 112B, and 112C, a front end circuit network 104 with three front end circuits 105A, 105B, and 105C, a switch network 106 with three switch devices 114A, 114B, and 114C, a receiver circuit 108 with three receivers 116A, 116B, and 116C, and a processing device 110. The front end circuit network 104 generates a set of RF signals in three frequency ranges x, y, and z yielding nine RF signals: $x_1$, $x_2$, $x_3$, $y_1$, $y_2$, $y_3$, $z_1$, $z_2$, and $z_3$.

Figure 3:
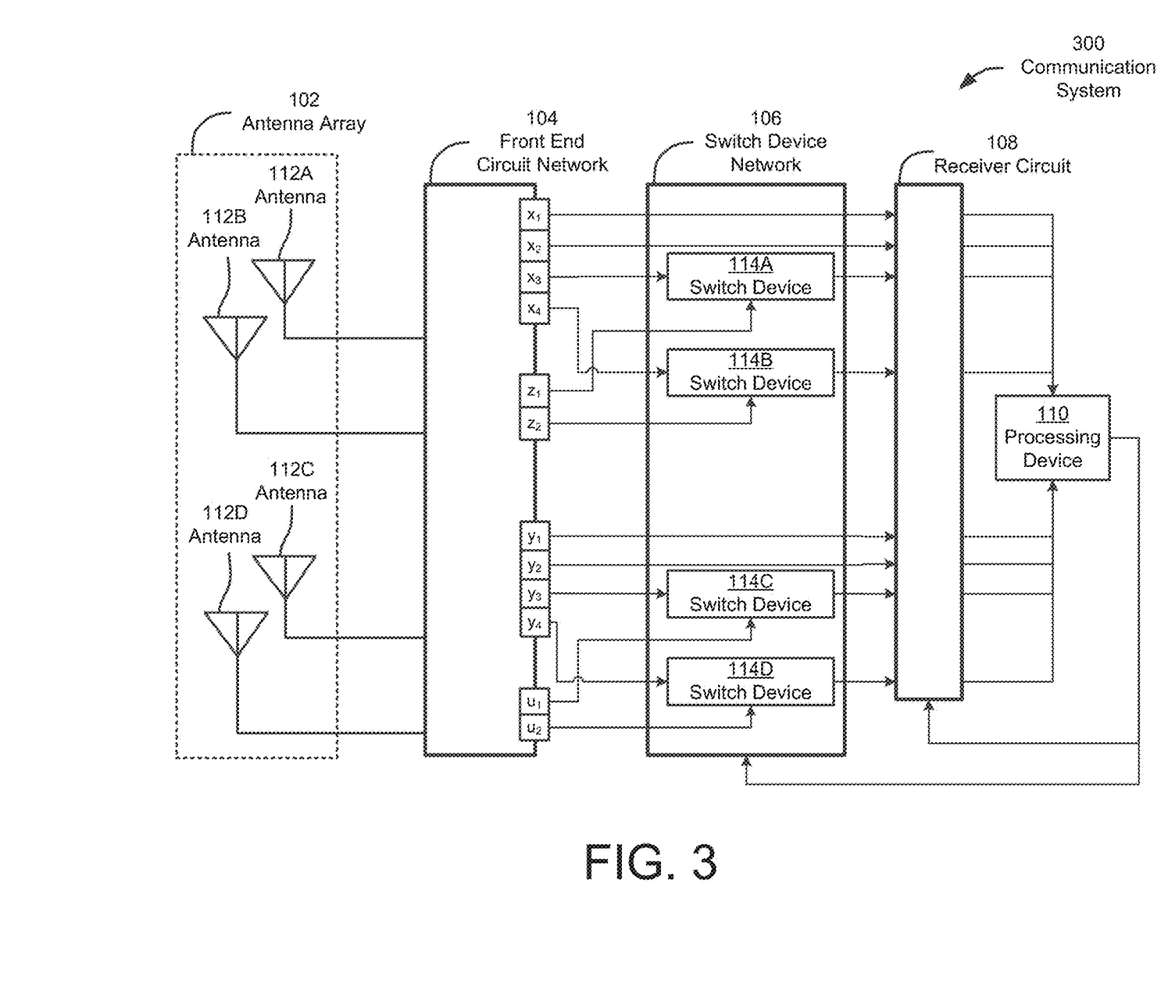
FIG. 3 shows yet another diagram of a communication system, according to some embodiments.

In some embodiments, one or more of the RF signals provided by the front end circuit network 104 may be directly coupled to the receiver circuit 108 without passing through a switch device (and/or the switch device network 106). An example of such a communication system is shown in FIG. 3 by communication system 300. As shown, the communication system 300 comprises an antenna array 102 with four antennas 112A, 112B, 112C, and 112D, a front end circuit network 104, a switch network 106 with four switch devices 114A, 114B, 114C, and 114D, a receiver circuit 108, and a processing device 110. The front end circuit network 104 is configured to generate a set of RF signals in four frequency ranges x, y, z, and u yielding twelve RF signals: $x_1$, $x_2$, $x_3$, $x_4$, $y_1$, $y_2$, $y_3$, $y_4$, $z_1$, $z_2$, $u_1$, and $u_2$. The RF signals $x_1$, $x_2$, $y_1$, and $y_2$ are directly provided from the front end circuit 104 to the receiver circuit 108 without passing through a switch device. It should be appreciated that the front end circuits in the front end circuit network 104 and the receivers in the receiver circuit 108 have been omitted from FIG. 3 only for the sake of clarity.

The communication system 300 is configured to operate in at least two different modes of operation including a first mode of operation where RF signals in two different frequency ranges are processed and a second mode of operation where RF signals in four different frequency ranges are processed. In the first mode of operation, the processing device 110 configures the switch devices 114A and 114B to provide RF signals $x_3$ and $x_4$, respectively, to the receiver circuit 108 and configures the switch devices 114C and 114D to provide RF signals $y_3$ and $y_4$, respectively, to the receiver circuit 108. Thereby, the receiver circuit 108 receives RF signals $x_1$, $x_2$, $x_3$, and $x_4$ in range x and RF signals $y_1$, $y_2$, $y_3$, and $y_4$ in range y. In the second mode of operation, the processing device 110 configures the switch devices 114A and 114B to provide RF signals $z_1$ and $z_2$, respectively, to the receiver circuit 108 and configures the switch devices 114C and 114D to provide RF signals $u_1$ and $u_2$, respectively, to the receiver circuit 108. Thereby, the receiver circuit 108 receives RF signals $x_1$ and $x_2$ in range x, RF signals $y_1$ and $y_2$ in range y, RF signals $z_1$ and $z_2$ in range z, and RF signals $u_1$ and $u_2$ in range u.

Figure 4A:
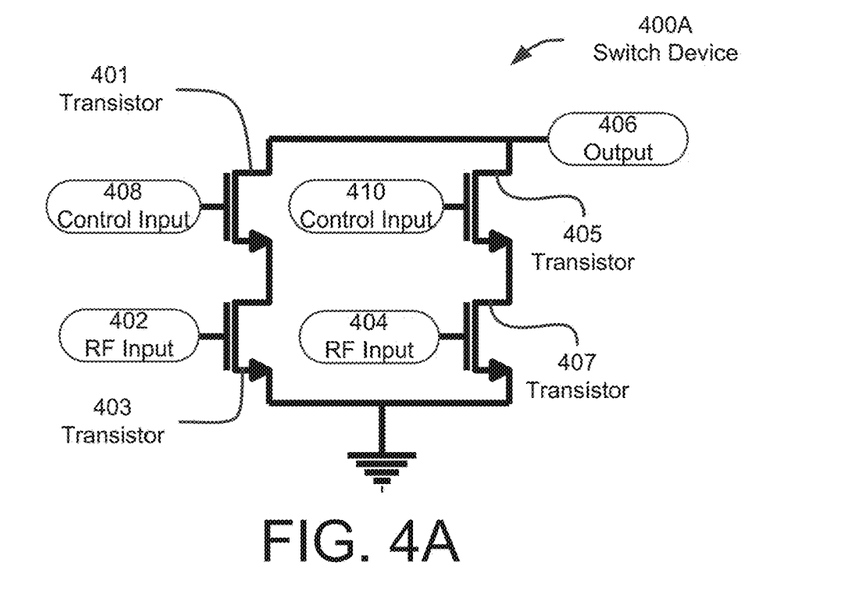
FIG. 4A shows a diagram of a switch device, according to some embodiments.

FIG. 4A shows an example switch device 400A that may be employed as, for example, switch devices 114A-114D described above. The switch device 400A is configured to receive a plurality of RF inputs and selectively provide an amplified version of a selected one of the RF inputs as an output. As shown, the switch device 400A comprises a first RF input 402 to receive a first RF signal, a second RF input 404 to receive a second RF signal, an output 406 to provide an output RF signal, a first control input 408 to receive a control signal, a second control input 410 to receive an inverted control signal, and a plurality of transistors 401, 403, 405, and 407. The plurality of transistors 401, 403, 405, and 407 may be, for example, n-type transistors.

The transistors 401 and 403 are coupled in series between a reference potential (e.g., ground) and the output 406. The transistor 401 has a gate terminal configured to receive a control signal from the control input 408 and the transistor 403 has a gate terminal configured to receive a first RF signal from the first RF input 402. The transistors 405 and 407 are coupled in series with each other and coupled parallel with the transistors 401 and 403. The transistor 405 has a gate terminal configured to receive an inverted control signal from the control input 410 and the transistor 407 has a gate terminal configured to receive a second RF signal from the second RF input 404.

The output of the switch device 400A may be controlled by changing a state of the control signal to the control input 408 and the inverted control input 410. If the control signal is in a high state (and the inverted control signal is in a low state), the transistor 401 is turned on and the transistor 405 is turned off. Thereby, an amplified version of the RF signal received at the first RF input 402 is provided to the output 406. If the control signal changes to a low state (and the inverted control signal is in a high state), the transistor 401 is turned off and the transistor 405 is turned on. Thereby, an amplified version of the RF signal received at the second RF input 404 is provided to the output 406.

Figure 4B:
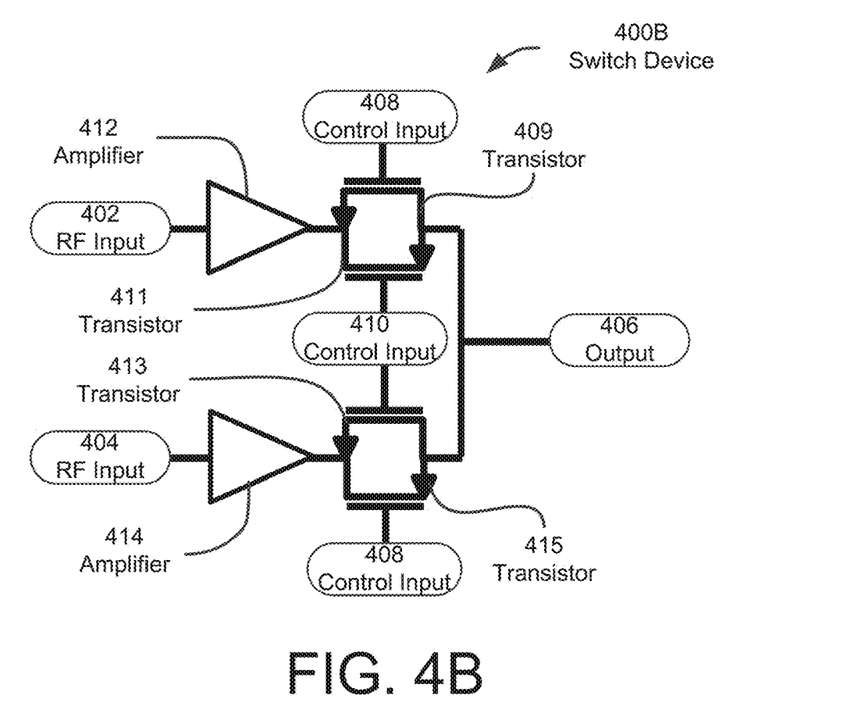
FIG. 4B shows another diagram of a switch device, according to some embodiments.

FIG. 4B shows another example switch device 400B that may be employed as, for example, switch devices 114A-114D described above. The switch device 400B is configured to receive a plurality of RF inputs and selectively provide an amplified version of a selected one of the RF inputs as an output. As shown, the switch device 400B comprises a first RF input 402 to receive a first RF signal, a second RF input 404 to receive a second RF signal, an output 406 to provide an output RF signal, a first control input 408 to receive a control signal, a second control input 410 to receive an inverted control signal, amplifiers 412 and 414, and a plurality of transistors 409, 411, 413, and 415. The transistor 409 and 413 may be n-type transistors and the transistors 411 and 415 may be p-type transistors.

The amplifier 412 receives the first RF signal from the first RF input 402 and provides an amplifier version of the first RF signal. The transistors 409 and 411 are coupled in parallel between the amplifier 412 and the output 406. The transistor 409 has a gate terminal configured to receive a control signal from the control input 408 and the transistor 411 has a gate terminal configured to receive an inverted control signal from the control input 410. The amplifier 414 receives the second RF signal from the second RF input 404 and provides an amplified version of the second RF signal. The transistors 413 and 415 are coupled in parallel between the amplifier 414 and the output 406. The transistor 413 has a gate terminal configured to receive an inverted control signal from the control input 410 and the transistor 415 has a gate terminal configured to receive a control signal from the control input 408.

The output of the switch device 400B may be controlled by changing a state of the control signal to the control input 408 and the inverted control input 410. If the control signal is in a high state (and the inverted control signal is in a low state), the transistors 409 and 411 are turned on while the transistors 413 and 415 are turned off. Thereby, an amplified version of the RF signal received at the first RF input 402 is provided to the output 406. If the control signal changes to a low state (and the inverted control signal is in a high state), the transistors 409 and 411 are turned off while the transistors 413 and 415 are turned on. Thereby, an amplified version of the RF signal received at the second RF input 404 is provided to the output 406.

It should be appreciated that the switch devices 400A and 400B may be readily extended to receive more than two RF input signals. For example, additional pairs of series transistors may be added in parallel with the transistor pair 401 and 403 to add additional RF inputs to the switch device 400A.

Having described an example method of operation, it should be appreciated that various alternations may be made to the described method without departing from the scope of the present disclosure. For example, various acts may be omitted, combined, repeated, or added. Further, the acts in the method described herein do not need to be performed in the particular order shown.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

It should be appreciated that the above described transistors may be implemented in any of a variety of ways. For example, one or more of the transistors may be implemented as bipolar junction transistors or field-effect transistors (FETs), such as metal-oxide semiconductor field-effect transistors (MOSFETs), junction field-effect transistors (JFETs), and heterostructure field-effect transistors (HFETs).

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A communication system, comprising:
   a first switch device configured to receive a first plurality of radio frequency (RF) signals detected by an antenna array and provide an RF signal selected from among the first plurality of RF signals to a first receiver of a receiver circuit, the first plurality of RF signals comprising:
      a first RF signal from a first antenna of the antenna array in a first frequency range; and
      a second RF signal from a second antenna in the antenna array in a second frequency range that is different from the first frequency range; and
   a second switch device configured to receive a second plurality of RF signals detected by the antenna array and provide an RF signal selected from among the second plurality of RF signals to a second receiver of the receiver circuit, the second plurality of RF signals comprising:
      a third RF signal from the second antenna in the first frequency range; and
      a fourth RF signal from the first antenna in the second frequency range.

2. The system of claim 1, further comprising a front end circuit network configured to filter a first signal from the first antenna to generate the first RF signal and the fourth RF signal.

3. The system of claim 2, wherein the front end circuit network is configured to filter a second signal from the second antenna to generate the second RF signal and the third RF signal.

4. The system of claim 1, wherein the first switch device is configured to amplify the RF signal selected from the first plurality of RF signals.

5. The system of claim 1, wherein the first switch device is configured to receive a control signal and select the RF signal from among the first plurality of RF signals to provide to the receiver circuit based on the control signal.

6. The system of claim 5, wherein the first switch device comprises an output to provide the RF signal selected from among the first plurality of RF signals and a first transistor coupled to the output and having a gate terminal configured to receive the control signal.

7. The system of claim 6, wherein the first switch device comprises a second transistor coupled in series with the first transistor and having a gate terminal configured to receive the first RF signal.

8. The system of claim 6, wherein the first switch device comprises an input to receive the first RF signal and an amplifier coupled between the input and the first transistor.

9. The system of claim 8, wherein the first switch device comprises a second transistor coupled in parallel with the first transistor and having a gate terminal configured to receive an inverted version of the control signal.

10. The system of claim 1, further comprising the antenna array and the receiver circuit.

11. The system of claim 1, further comprising a processing device configured to receive an output from the receiver circuit and control operation of the first switch device based on the received output from the receiver circuit.

12. A communication system comprising:
    a first switch device configured to receive a first plurality of radio frequency (RF) signals detected by an antenna array and select an RF signal from among the first plurality of RF signals to provide to a receiver circuit based on a first control signal;
a second switch device configured to receive a second plurality of radio frequency (RF) signals detected by the antenna array and select an RF signal from among the second plurality of RF signals to provide to the receiver circuit based on a second control signal; and
a processing device configured to select a mode of operation from among a plurality of modes of operation and generate the first control signal and the second control signal based on the selected mode of operation, the plurality of modes of operation comprising:
a first mode of operation where RF signals in at least two different frequency ranges from a first antenna of the antenna array are provided to the receiver circuit; and
a second mode of operation where RF signals in the at least two different frequency ranges from a second antenna of the antenna array are provided to the receiver circuit.

13. The system of claim 12, wherein the processing device is configured to receive an output from the receiver circuit and select the mode of operation from among the plurality of modes of operation based on the output from the receiver circuit.

14. The system of claim 12, wherein the first plurality of RF signals comprises:
a first RF signal from the first antenna in a first frequency range of the at least two different frequency ranges; and
a second RF signal from the second antenna in a second frequency range of the at least two different frequency ranges.

15. The system of claim 14, further comprising a front end circuit network configured to filter a first signal from the first antenna to generate the first RF signal.

16. The system of claim 15, wherein the front end circuit network is configured to filter a second signal from the second antenna to generate the second RF signal.

17. The system of claim 12, wherein the first switch device comprises an output to provide the RF signal selected from among the first plurality of RF signals and a first transistor coupled to the output and having a gate terminal configured to receive the first control signal.

18. The system of claim 17, wherein the first switch device comprises a second transistor coupled in series with the first transistor and having a gate terminal configured to receive one RF signal from among the first plurality of RF signals.

19. The system of claim 17, wherein the first switch device comprises an input to receive one RF signal from among the first plurality of RF signals and an amplifier coupled between the input and the first transistor.

20. The system of claim 19, wherein the first switch device comprises a second transistor coupled in parallel with the first transistor having a gate terminal configured to receive an inverted version of the first control signal.

* * * * *